United States Patent [19]

Hovmand et al.

[11] 4,062,641

[45] Dec. 13, 1977

[54] AGGLOMERATION UNIT

[75] Inventors: Svend Hovmand, Horsholm; Erik Dankvard Sørensen, Skovlunde, both of Denmark

[73] Assignee: A/S Niro Atomizer, Soborg, Denmark

[21] Appl. No.: 733,172

[22] Filed: Oct. 18, 1976

[30] Foreign Application Priority Data

July 9, 1976 Denmark .............................. 3122/76

[51] Int. Cl.² .............................................. B29J 1/00
[52] U.S. Cl. ................................... 425/6; 23/293 A; 23/313 FB; 425/222; 426/285
[58] Field of Search ................... 426/285, 453; 23/313, 23/293 A, 313 FB; 425/222, 6, 8; 264/117; 99/471, 474, 516, 536

[56] References Cited

U.S. PATENT DOCUMENTS

| | | | |
|---|---|---|---|
| 986,271 | 3/1911 | Dicke | 23/313 X |
| 2,077,819 | 4/1937 | Zizinia | 426/285 X |
| 3,151,984 | 10/1964 | Peebles et al. | 426/453 X |
| 3,228,115 | 1/1966 | Swanson et al. | 23/313 X |
| 3,331,306 | 7/1967 | Hutton et al. | 426/453 X |
| 3,549,336 | 12/1970 | Hodel | 426/453 X |
| 3,830,943 | 8/1974 | Hix et al. | 426/285 |
| 3,949,096 | 4/1976 | Johnson et al. | 426/285 X |
| 3,966,975 | 6/1976 | Hansen et al. | 426/285 |

OTHER PUBLICATIONS

Jensen, Food Technology, 6/1975, pp. 60, 62, 64, 65, 68, 70, 71, "Advances in Agglomerating, Instantizing and Spray Drying."

Primary Examiner—Robert L. Lindsay, Jr.
Assistant Examiner—Kenneth M. Schor
Attorney, Agent, or Firm—Bacon & Thomas

[57] ABSTRACT

An agglomerating unit having a rotatable, conical, downwardly, narrowing section on the interior surface of which moistened powder is deposited. Close to said interior surface a stationary scraper is mounted. When the conical section is rotated the powder is dislodged from said surface by the scraper. A very efficient removal of powder is obtained whereby the risk of biological or chemical deterioration of the powder is reduced.

3 Claims, 1 Drawing Figure

U.S. Patent      Dec. 13, 1977      4,062,641
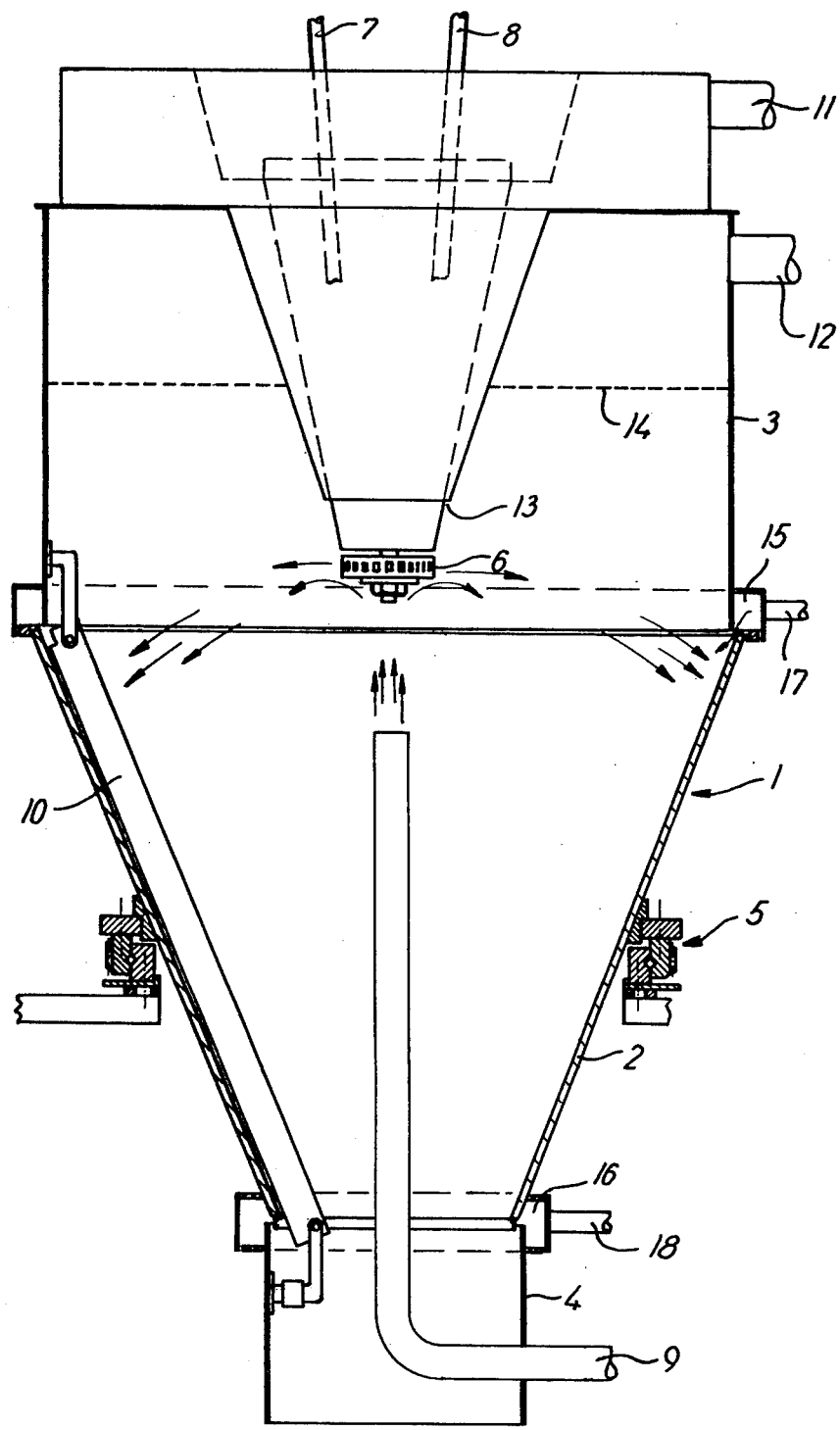

AGGLOMERATION UNIT

This invention relates to an agglomeration unit comprisa chamber having a conical downwardly narrowing portion, an upper portion on top thereof which at least at its lower end is of circular cross-section with substantially the same diameter as the largest diameter of said conical portion, a lower portion disposed below said conical portion which at least at its upper end is of circular cross-section with substantially the same diameter as the smallest diameter of said conical portion, an atomizer wheel co-axially disposed in said chamber and connected with at least one wetting liquid supply pipe, and an axial powder injection pipe terminating below said atomizer wheel.

When agglomerating a powdered material sticky properties are imparted to the surface of the individual particles which are then brought into contact with each other so that they adhere to one another to form larger or smaller agglomerates. The surface of the powder particles can be made sticky either by the application of a material having sticky properties or by being wetted with a liquid which in itself does not possess sticky properties but is capable of dissolving part of the material, of which the powder is composed, and produce on the surface of the particles a solution having sticky properties.

In the present specification the words "wetting liquid" are meant to comprise both a liquid which contains substances having a sticky effect, and a liquid which has only a dissolving effect on certain components of the powder where this will suffice for bringing an agglomeration about.

In several of the prior art agglomeration methods and units the wetting of the powder particles is effected while these are still airborne whereupon the wetted particles are caused to hit a solid wall where the individual particles are brought into mutual contact. In some cases, however, contact will to some extent also take place already while the particles are airborne.

Subsequent to the wetted powder particles having hit the solid wall they are — if desired after a short period of rest on the wall — transferred to a drying unit where the volatile components of the wetting liquid are removed, at least partially.

During this drying process the particles must to a suitable degree remain stuck together but subsequent to drying a substantial portion of the powder particles will normally be present in non-agglomerated form or in the form of too small agglomerates, and this portion is therefore returned for rewetting in the agglomerating unit. The percentage by weight of the product which after one cycle is present in the form of agglomerates of suitable size, is referred to as the efficiency of the agglomerating unit.

An agglomerating unit operating on the principle described above is for example known from U.S. Pat. No. 3,151,984. This specification comprises an illustration of an agglomerating unit of the type described in the first paragraph of this description.

In the unit shown in said patent specification the conical portion is rigidly connected with the upper portion and the lower portion. Close to the inner surface of said conical portion provision has been made for a cleaning device (airsweep) in the shape of a pipe with perforations through which air under pressure is directed to said conical wall. This cleaning device is fixed to a rotary shaft which extends to the exterior through the lower part of the chamber and connects with drive means below the chamber.

In the operation of this prior art unit, liquid wetting material is atomized through the atomizer wheel, and powder is carried upwards in a stream of conveying air into a region below the atomizer head where the powder stream is deflected and commingles with the atomized droplets. The powder particles are hereby wetted and directed onto the conical wall where a substantial part of the particles collect for a while until the air sweep passes by the relevant location on the conical wall and dislodges the accumulated material which subsequently falls onto the bottom of the chamber from where it is directed to a drying installation.

This prior art unit is, however, encumbered with certain drawbacks and is not suitable for the agglomeration of a powder material which is difficult to agglomerate and requires a particularly thorough wetting treatment. In this case air under pressure ejected from the airsweep will as a matter of fact not be capable of sufficiently removing the very moist powder from the walls of the conical chamber which particularly in connection with the agglomeration of foods involves problems of hygienic nature. Further, there are problems with the introduction of the rotary cleaning device drive shaft, because this occupies space that would otherwise be available for the discharge of the moist powder, and with this design it is difficult to ensure a precise movement of the cleaning device.

An agglomerating unit of quite a different design is known, see J. Due Jensen: Food Technology, pages 60–71 (1975), FIG. 3, which in principle is suitable for imparting a great moisture content to powdered materials. This latter prior art unit comprises an upwardly tapered cone rotating inside a chamber, and powder and water atomized through a nozzle impinge on the outside walls of the rotary cone. Along the cone provision has been made for a mechanical scraper ensuring that the moist powder is dislodged from the wall of the cone, also in such cases where the powder is very sticky on account of a high moisture content.

This unit is, however, encumbered with the drawback that the water used for wetting the powder, is atomized by means of a nozzle which, however, does not afford the same flexibility as an atomizer wheel as regards the quantity of liquid to be atomized. Moreover, cleaning of this latter unit is a rather laborious job.

The agglomerating unit according to the invention is not encumbered with the drawbacks described above in connection with the two prior art agglomerating units.

Thus the unit according to the invention permits a substantially more thorough wetting of the powder than is possible when using the unit known from U.S. Pat. No. 3,151,984, and it provides improved hygienic conditions in the production in that the inner walls of the unit are more efficiently cleaned, and at the same time the unit affords great flexibility with a view to achieving optimal operation because the liquid is not atomized by means of a nozzle but by means of a rotary atomizer wheel.

The unit according to the invention is of the type described in the first paragraph of this description, and it is characterized in that the conical portion is disposed rotatably around its axis, and that along a generatrix near the inner wall of the conical portion provision has been made for a stationary scraper which is fixed to the upper portion and/or the lower portion, preferably to both portions, and which extends downwards to at least the lower edge of the conical portion.

It has proved in practice that the unit can at relatively low costs be manufactured with such great degree of accuracy that in contrast to what would be the case if the scraper were driven by a shaft introduced through the lower portion of the chamber, it is possible to maintain a very small gap between the scraper and the inner wall of the rotary cone. Thus, this gap may be as small as 0.2 mm. This means that in contrast to what would be the case if the conical surface were to be cleaned by means of jets of air under pressure, there is no risk of larger amounts of moist powder being retained on the wall with the consequence that such accumulations later on, perhaps subsequent to a chemical or biological deterioration, are dislodged and contaminate the product.

Further, the use of a stationary scraper means that the introduction of a rotary shaft co-axially with and encircling the powder injection pipe can be dispensed with, whereby more space in the lower portion of the unit will be available for the discharge of moist powder.

To prevent the powder from leaving the unit at the transitions between the rotary conical portion and the stationary portions, or germ-containing air from entering the unit, a preferred embodiment of the unit according to the invention is characterised in that at the transitions between the conical portion and the upper and lower portions, respectively, provision has been made for surrounding channels which are in communication with a soruce of air under pressure. The pressurized air supplied to these channels has, of course, where a low germ-figure in the product is important, been filtered or otherwise treated with a view to reducing the germ content.

The air supplied to these channels is preferably heated air so that the air entering the chamber from these channels serves the additional purpose of restraining condensation of liquid on the parts of the unit that get into contact with the air.

The unit has proved particularly suitable for agglomerating products which are normally considered difficult to agglomerate on account of their contents of partly pregelatinized starch, e.g. baby food. Moreover, particularly satisfactory results have been achieved with cocoa-sugar mixtures. In comparison with the prior art units a high degree of efficiency (as above defined) has been achieved with both of these types of product, and the agglomeration could be effected without any detectable increase of the germ-figure of the product.

The invention will be explained in detail below with reference to the accompanying drawing which shows an embodiment of the unit concerned.

This unit comprises a chamber which in the drawing has been generally designated 1. This chamber comprises a conical downwardly narrowing portion 2, an upper portion 3 on top thereof which in the embodiment shown is circular-cylindrical. A decisive feature is that at least the lower end of portion 3 is of circular cross-section with substantially the same diameter as the upper end of conical portion 2.

Below conical portion 2 provision has been made for a lower portion 4 which in the embodiment shown is also circular-cylindrical. To portion 4 it also applies that the end thereof facing the conical portion must have substantially the same diameter as the adjacent end of the conical portion.

Portions 3 and 4 are stationarily secured to a base (not shown) whereas conical portion 2 rests in an annular bearing 5 in connection with which provision has been made for drive means (not shown) for rotating conical portion 2 about its vertical axis.

Within chamber 1 there is a rotatable atomizer wheel 6 which is connected to drive means (not shown). Extending downwardly towards said atomizer wheel there are in the embodiment shown two feed pipes 7 and 8 for liquid wetting material. If necessary one of said pipes may expediently be used for feeding a solution of products which it is desired to apply to the powder in a predetermined quantity per weight unit of powder, whereas the other pipe may be used for feeding water or some other solvent which is eventually removed from the powder. In the operation of the unit the solution feed would in this case be maintained at a constant rate depending on the amount of powder supplied, whereas the amount of water or other solvent supplied through the other pipe may be varied during the process with a view to achieving optimal agglomeration. In this way it is possible to vary the amount of wetting of the powder without altering the composition of the final product.

Through lower portion 4 and upwards into conical portion 2 a powder injection pipe 9 extends which terminates centrally in the region below the atomizer wheel. Within the chamber there is a scraper 10 which is fixed to portions 3 and 4, respectively.

The scraper extends along a generatrix of the conical portion and can by means not shown be adjusted so that the gap between the scraper and conical portion 2 is very small.

When the unit is in operation, liquid wetting material is supplied through pipes 7 and 8 as above explained, and this liquid it atomized in atomizer wheel 6. At the same time the powder to be agglomerated, part of which may consist of recycled fine particles, is supplied through powder injection pipe 9 by means of air under pressure.

The powder supplied through pipe 9 encounters the cloud of droplets leaving atomizer wheel 6 and dependent on circumstances a certain combination of the individual particles into larger agglomerates takes place already while the powder is airborne. The moist powder follows a curved path as arrowed in the drawing and impinge on the inner walls of conical portion 2. In order to better guide the atomized droplets from the atomizer wheel and the powder along the desired path, air under pressure is supplied through pipe 11. The pressurized air enters chamber 1 at relatively high speed through an annular gap 13 above the atomizer wheel. By controlling the amount of air it is possible to obtain a suitable slantingly downward movement of the atomized liquid and the powder. Further, air is supplied through pipe 12, said air entering the chamber through one or more perforated plates 14 whereby the top portion 3 of the chamber is maintained clean and dry.

The moist powder impinging on conical portion 2 will for the greater part collect preliminarily on said portion whereas the remainder will be discharged through lower portion 4.

As a consequence of the rotation of conical portion 2 the moist powder deposited on the inner surface of said conical portion will be scraped off by scraper 10 and fall down through lower portion 4 from where it is directed to a drying unit, not shown, for example a vibrating fluidized bed unit. Such dryers are known.

Owing to the very small gap that can be maintained between the scraper and the inner wall of the conical portion, only very insignificant quantities of moist powder will be retained on the conical portion when it has passed scraper 10, and these very insignificant quantities that may be retained, have no tendency to fall down and contaminate the final product but will remain on the wall until the operation of the unit is discontinued whereupon said insignificant quantity of powder may be washed out.

The transitions between conical portion 2 and upper portion 3 and between conical portion 2 and lower portion 4 are surrounded by annular channels 15 and 16, respectively. Through pipes 17 and 18, respectively, said annular channels are supplied with air under pressure which in similarity to any quantity of air supplied to the unit preferably has a low germ-figure. This prevents loss of powder at the transition between said portions, and prevents the products from being contaminated by germs entering from the environment.

The air supplied to the chamber via pipes 9, 11, 12 17 and 18 as well as via other supply channels, not shown, leaves the chamber through lower portion 4 together with the moist powder, and may expediently be separated from said powder in the connected dryer, not shown.

For the purpose of avoiding condensation, the air supplied may be suitably heated.

The invention will be explained in more detail by means of the following examples.

EXAMPLES

In the Examples 1 to 4 below use was made of an agglomeration unit of the type shown in the drawing. The diameter of the upper portion 3 was 1 meter. Conical portion 2 rotated at a rate of 18 rpm. The atomizer wheel had a diameter of 120 mm and rotated at a rate of 24,000 rpm. The liquid wetting material used was water.

In all examples the wetted powder was after-dried in hot air in a vibrating fluidised bed and then passed through a screen which produced 3–4 fractions, viz. lumps, possibly an oversize fraction, a final product and an undersize fraction. The oversize fraction was broken down and then recycled together with the undersize fraction The raw materials treated, which are denominated A, B, C and D, have the following compositions.

A

The product was a typical baby food consisting of:
30% skim milk powder
30% sugar
30% pre-gelatinished starch
9% fat
Specific gravity 0.5 to 0.6 g/ml

B

The product was a typical baby food consisting of wheat flour, pease meal, lentil meal and sesame meal.

C

The product was a cocoa mixture consisting of:
85% sacharose
15% cocoa

D

The product was likewise a cocoa mixture of approx. the following composition:

33% saccharose
33% skin milk powder
20% alkalised and lecithinated cocoa
Remainder additives (minerals, vitamins, etc.).

| Example No. | 1 | 2 | 3 | 4 |
| --- | --- | --- | --- | --- |
| Product | A | B | C | D |
| Feed rates | | | | |
| Raw material kg/h | 280 | 98 | 480 | 1275 |
| Water | 42 | 42 | 42 | 135 |
| Air+) | 500 | 500 | 500 | 1000 |
| Water temperature °C | 20 | 20 | 20 | 80 |
| Air temperature °C | 50 | 80 | 50 | 48 |
| Water content, % in | | | | |
| wetted product | 13,9 | 27,5 | 8,2 | 9 |
| after-dried product | 2,3 | 6,0 | 1,1 | 2,3 |
| Final product kg/h | 227 | 68 | 244 | 675 |
| Particle size of | | | | |
| final product: mm | 0,43–3,0 | 0,43–3,0 | 0,25–2,0 | 0,15–1,5 |
| Efficiency % | 81 | 69 | 51 | 53 |
| Specific gravity of | | | | |
| final product | | | | |
| - loose | 0,20 | 0,23 | 0,38 | 0,35 |
| - tapped 100 times | 0,23 | 0,25 | 0,42 | 0,38 |

+) Quantity of air through gap 13.

The instant properties of agglomerated products A and B were examined by stirring 50 g into 170 ml of water at 50° C. After light stirring a thin mush without any lumps whatsoever was produced.

Product C was examined by pouring 15 g of powder onto the surface of 100 ml of sweet milk at 10° C. The powder sank in the course of 5 seconds and was readily dispersible by stirring.

Product D was examined by pouring 25 g of powder onto the surface of 100 ml of water at 60° C. The powder sank in the course of ca. 7 seconds and was readily dispersible by stirring.

Also the good dispersibility of the products in water and milk shown that the desired agglomeration was achieved.

What is claimed is:

1. Agglomerating unit comprising a chamber (1) having means defining a conical, downwardly narrowing portion of the chamber (2), at the top of the chambers means defining an upper stationary annular portion of the chamber (3) which at least at its lower end is of circular cross-section of substantially the same diameter as the largest diameter of the conical portion closely adjacent thereto and coaxial therewith, means defining a lower stationary portion of the chamber (4) disposed below said conical portion, which at least at its upper end is of circular cross-section of substantially the same diameter as the smallest diameter of the conical portion closely adjacent thereto and coaxial therewith, an atomizer wheel (6) disposed coaxially in said chamber and connected with at least one pipe means (7,8) or flowing wetting liquid to said atomizer wheel and an axial powder injection pipe (9) extending upwardly in said chamber and terminating in the region below said atomizer wheel, wherein only said means defining a conical portion (2) is mounted for rotation around its axis, and a stationary scraper (1) fixedly secured to said means defining an upper portion (3) and to said means defining a lower portion (4) said scraper extending downwardly to at least the lower edge of said conical portion in close proximity to the inner surface of said conical portion.

2. Agglomerating unit as claimed in claim 1, wherein the transitions between the conical portion (2) and the upper and lower portions (3 and 4), respectively, are surrounded by inwardly open annular channels (15 and 16) which are in communication with means defining a source of air under pressure.

3. Agglomerating unit as claimed in claim 1 wherein above the atomizer wheel (6) and coaxially in relation thereto, means define an annular orifice (13) directed downwardly for introduction of air under pressure into said chamber.

* * * * *